(12) United States Patent
Scaggs et al.

(10) Patent No.: US 7,489,429 B2
(45) Date of Patent: Feb. 10, 2009

(54) PRECISION LASER MACHINING APPARATUS

(75) Inventors: Michael J. Scaggs, 1612 Eastlake Way, Weston, FL (US) 33326; Thomas Schoelzel, Pompano Beach, FL (US); Sergei V. Govorkov, Los Altos, CA (US)

(73) Assignee: Michael J. Scaggs, Weston, FL (US)

( * ) Notice: Subject to any disclaimer, the term of this patent is extended or adjusted under 35 U.S.C. 154(b) by 51 days.

(21) Appl. No.: 11/674,730

(22) Filed: Feb. 14, 2007

(65) Prior Publication Data

US 2008/0192322 A1    Aug. 14, 2008

(51) Int. Cl.
*G02B 26/08*    (2006.01)
(52) U.S. Cl. .................................... 359/210; 359/209
(58) Field of Classification Search .................. 359/210
See application file for complete search history.

(56) References Cited

U.S. PATENT DOCUMENTS

| | | |
|---|---|---|
| 4,079,230 A | 3/1978 | Miyauchi et al. |
| 4,896,944 A | 1/1990 | Irwin et al. |
| 4,940,881 A | 7/1990 | Sheets |
| 5,626,778 A * | 5/1997 | Freedenberg et al. .. 219/121.74 |
| 6,501,045 B1 | 12/2002 | Bernstein et al. |

\* cited by examiner

*Primary Examiner*—James Phan
(74) *Attorney, Agent, or Firm*—Ronald E. Smith; Smith & Hopen, P.A.

(57) ABSTRACT

A focused laser beam having an optical axis passes through a first lens mounted to a first galvanometer and a second lens mounted to a second galvanometer. The first galvanometer is adapted to tilt the first lens about a X axis and the second galvanometer is adapted to tilt the second lens about a Y axis. This displaces the focused laser beam in a controlled manner from the optical axis to enable laser machining of very precise geometric features over a large processing window. In a preferred embodiment, the first and second lenses are a pair of inverted positive meniscus lenses, of high index of refraction material.

7 Claims, 9 Drawing Sheets

X-Z PLANE

Y-Z PLANE

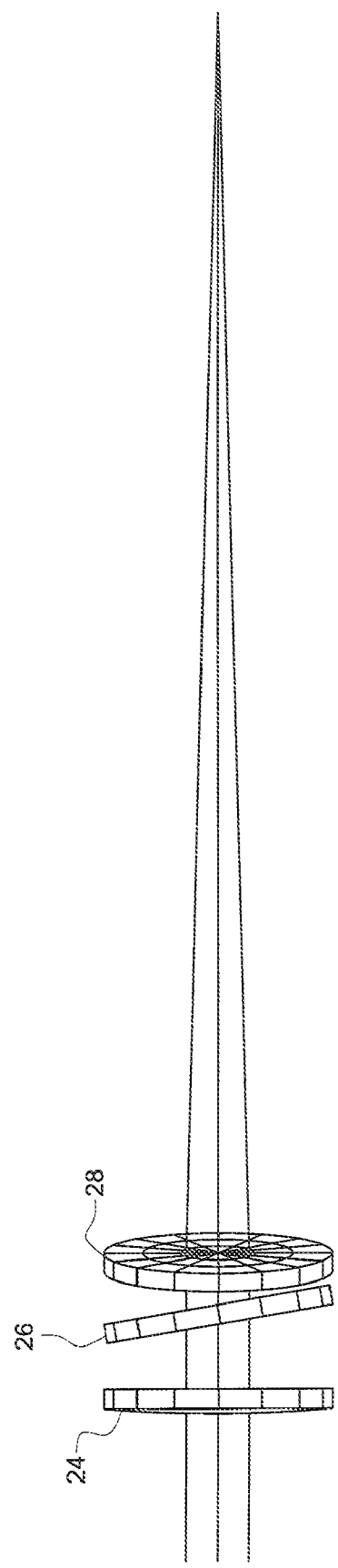

PRECISION LASER MACHINING APPARATUS

BACKGROUND OF THE INVENTION

1. Field of the Invention

This invention relates to optical scanning devices used for laser machining. More particularly, it relates to a high precision laser hole drilling and controlled material removal of geometries of less than 500 microns.

2. Description of the Prior Art

Galvanometer scanners have been used for nearly three (3) decades for laser material processing. They are most commonly used for laser marking. They have less utility in fine machining applications, in particular drilling precision holes and features below 250 microns, because their positional accuracy is limited below such threshold. Non-galvo-based approaches are limited to circular features and tend to be more optically and mechanically complex. Galvanometer-based systems are the simplest and least expensive way to direct a focused laser beam over a wide area. Nevertheless, they lack the "localized" precision for finite features over a large field.

Thus there is a need for a galvanometer-based apparatus that includes localized precision for finite features over a large field.

The prior art also includes an air bearing X-Y stage that moves under a fixed focused laser beam, providing precision and accuracy. However, air bearing devices are expensive and subject to high inertia arising from moving such stages and the part supported by the stage.

Thus there is a need for a structure that provides the precision and accuracy of an air bearing X-Y stage without the high cost and the inherent inertia.

A conventional multi-mirror galvometric system positions a focused laser beam by moving the mirrors by means of vectors. There are no "true arcs" generated for circular features. Instead, a circle is approximated by a series of short vectors. It is very difficult to form precision holes or any arc feature below 200 microns in diameter. Moreover, the angular resolution of the galvo motors is a further hindrance to the problem of small features and the attainment of high repeatability.

Thus there is a need for a system that is not detrimentally affected by the formation of circles and arcs through a series of short vectors.

The known systems are also subject to limited angular resolution and thermal drift which further hinders the ability of the device to machine precision features over a long period of time, e.g., a single production shift in manufacturing.

There is a need, therefore, for a system that is less subject to the effects of limited angular resolution and thermal drift so that features can be machined over relatively long periods of time.

A need therefore exists for a device having an improved angular resolution relative to the known devices that have a pair of galvometrically driven mirrors.

Rotating, offset wedge pairs allow good precision below 250 microns, but they only permit circular features and have a limited dynamic range. The focus lens itself can be placed offset from the optical axis and rotated or even placed in an open frame X-Y stage used to make all conceivable geometries but mounting a lens in such a way is bulky and limited over the area that can be machined due to common lens aberrations.

There is thus a need for a device not subject to the limitations of rotating, offset wedge pairs or a rotating, offset focus lens.

Another known method, disclosed in U.S. Pat. No. 4,079,230, includes a pair of matched optical wedges that are rotationally offset and rotated in unison at high speeds. The offset of the matched wedges causes an angular displacement of the laser beam from the original optical axis. This angular deviation causes a lateral displacement of the focal spot when the angularly displaced beam is passed through a focus lens. The difficulty with this technique is that it is hard to coordinate the two wedges precisely at the high rotational speeds or to rapidly change the desired angle of deviation during such rotation. This technique usually requires a multitude of wedge pairs to cover a wide diameter range. The requirement to change wedge pairs adds significant time to replace and align; it is therefore unsatisfactory for most production processes. This method also limits the geometries to circular patterns only.

Other methods include "wobble plates" disclosed in U.S. Pat. Nos. 4,940,881 and 6,501,045 that provide circular and tapered features only and have limited workability in imaged based optical systems.

Another method, disclosed in U.S. Pat. No. 4,896,944, employs an offset focus lens that is rotated to displace the focused spot radially from the optical axis. Such systems are bulky but have utility when fixed diameter holes are required. They lack utility in creating complex features or tapers.

Thus there is a need for a system that has increased versatility relative to the known systems. More specifically, there is a need for a system that can provide complex shapes, including tapers and other non-circular shapes, and which can form features less than two hundred fifty microns (250 µm).

However, in view of the art considered as a whole at the time the present invention was made, it was not obvious to those of ordinary skill in this art how the identified needs could be met.

SUMMARY OF INVENTION

This invention provides a simple optical, electro-mechanical and software approach to directing a focused laser beam onto materials to machine simple and complex geometries. The novel structure provides the ease of use and simplicity of a galvo system but adds the "localized" precision lacking heretofore.

The novel structure provides the precision and accuracy comparable to an air bearing X-Y stage that moves under a fixed focused laser beam but without the high cost and higher inertia of moving such stage and the part. The present invention, in essence, demagnifies the scan field by more than two (2) orders of magnitude.

A common scanner with fair resolution can have a scan field of 50 mm×50 mm with an F-Theta lens having a focal length of 100 mm. This same scanner has great difficulty providing high accuracy of geometries below 250 micron, due to the angular resolution of the system and the fact that any curved features include a large number of straight vectors.

The apparatus of this invention uses the same control of the galvanometer but adds an optical demagnification that essentially maps the 50 mm×50 mm field into a 0.2 mm×0.2 mm field. This is accomplished by a laser galvo scanner that reflects a laser beam over an angular range of plus or minus (±) twelve to twenty degrees (12-20°) as the beam passes through a focusing lens, typically an F-theta lens. The angular repeatability of such a galvo is typically <±2.2 urad, which represents a resolution of ~±2.2 um for a scan lens having a 100 mm focal length. The field of such a system will be f*(Tan Θ), where f is the focal length of the lens and theta is the angle the beam is reflected before the lens. A laser scanner operating then over a plus or minus twelve degree (±12°) range with a f=100 mm lens will focus over a range of ±21.3 mm. The angular deviation of a beam refracted through a thin optic is determined by the index of refraction of the material and the angle the optic is tilted. Tilting a two millimeter (2 mm) thick optical plate that has an index of refraction of 1.796 over a range of plus or minus twelve degrees (±12°) degrees will cause a laser beam traveling on axis through said plate to deviate from the optical axis by plus or minus 0.188 mm. This reduces the resolution of the same galvo by the ratio of 21.2 mm/0.188 mm=113. This provides the benefit of the large field of a typical galvo scanner but adds another level of accuracy to the finite features within the large field.

The novel apparatus also compensates for irregularities in the focused laser beam. If a focal spot is elliptical, for example, the scanner is programmed to move in an opposing elliptical manner to compensate and achieve a perfectly round hole.

The primary object of this invention is to create an optical system that precisely and repeatedly locates a concentrated laser beam.

A closely related object is to manipulate the beam laser in such a way as to remove a wide variety of materials in a controlled way to generate complex geometries with excellent precision and repeatability.

BRIEF DESCRIPTION OF THE DRAWINGS

For a fuller understanding of the invention, reference should be made to the following detailed description, taken in connection with the accompanying drawings, in which:

FIG. 5 diagrammatically depicts a third embodiment;

DETAILED DESCRIPTION OF THE PREFERRED EMBODIMENT

Figure 1:
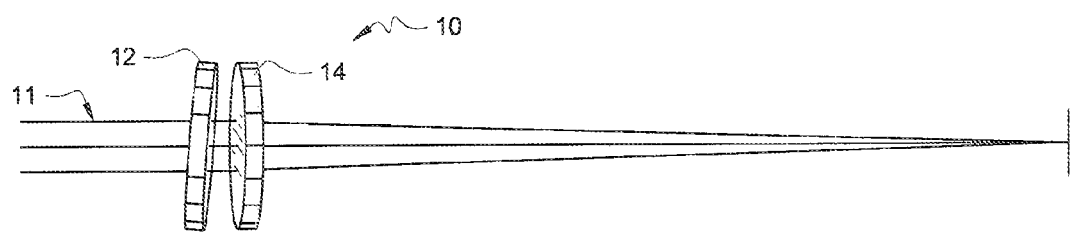
FIG. 1 is a diagram of a laser beam passing through a pair of tilted, inverted meniscus lenses in accordance with the first embodiment.

Referring now to FIG. 1, there it will be seen that the first embodiment of the invention is denoted as a whole by the reference numeral 10.

Incoming laser beam 11 passes through a pair of inverted positive meniscus lenses 12 and 14. Each lens is mounted to a galvanometer to tilt each lens perpendicular to one another to displace the focus laser spot from the original optical axis. The preferred optical material is the highest possible index material for the desired laser wavelength. Having a high index allows the thickness of the lenses to be as thin as possible to minimize optical aberrations and minimize the inertia on the galvo.

Figure 2A:
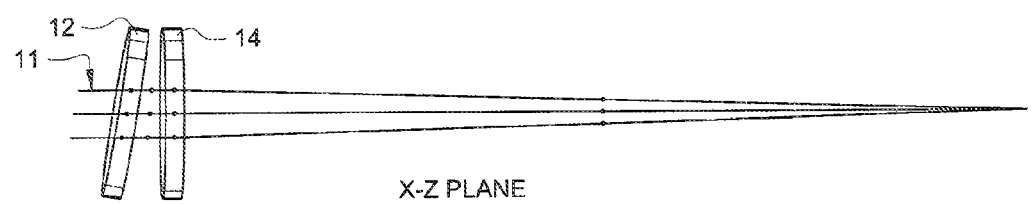
FIG. 2A is a diagram depicting the tilted, inverted meniscus lens pair of FIG. 1 in an X-Z plane where the Z plane represents the optical axis.

In FIG. 2A lens 12 is tilted about the Y axis to displace the focused laser beam in a controlled manner along the X axis from the original optical axis.

Figure 2B:
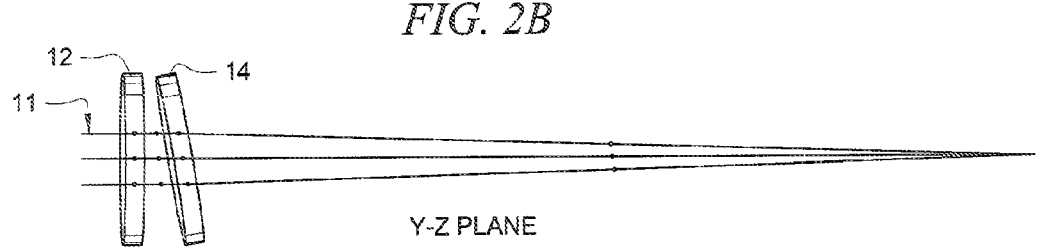
FIG. 2B is a diagram depicting the tilted, inverted meniscus lens pair of FIG. 1 in a Y-Z plane where the Z plane represents the optical axis.

In FIG. 2B, lens 14 is tilted about the X axis to displace the focused laser beam in a controlled manner along the Y axis from the original optical axis.

Figure 3A:
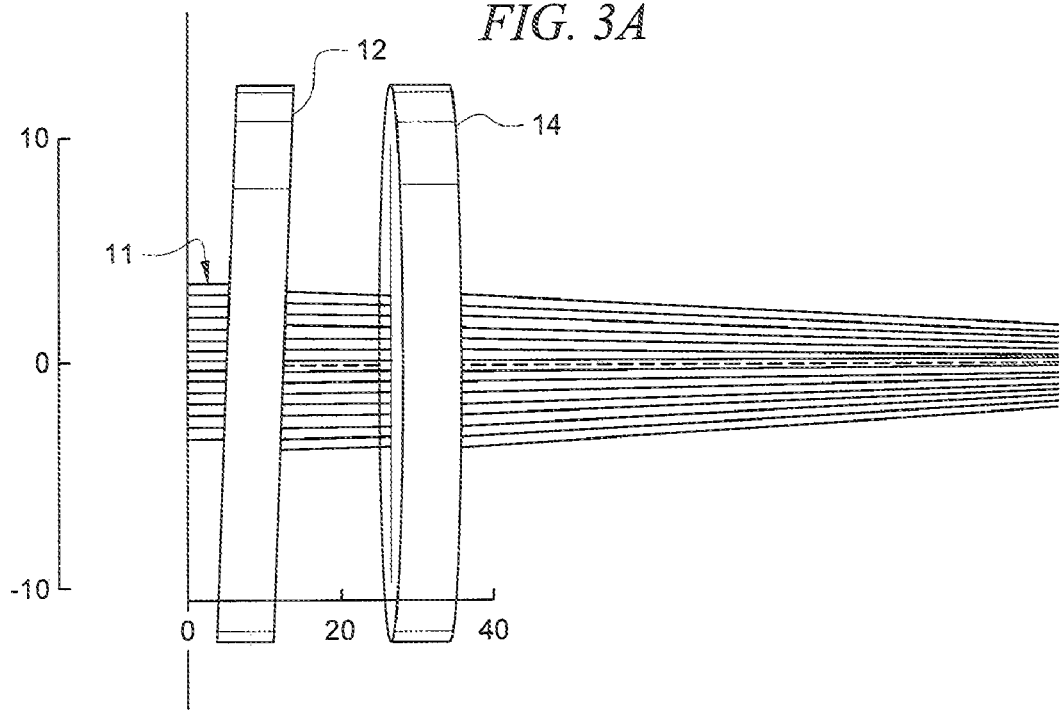
FIG. 3A is a magnified ray trace of the X-Z plane as light passes through the tilted, inverted meniscus lens pair.

An amplified ray trace of the X-Z plane as light passes through the tilted, inverted meniscus lens pair is depicted in FIG. 3A.

Figure 3B:
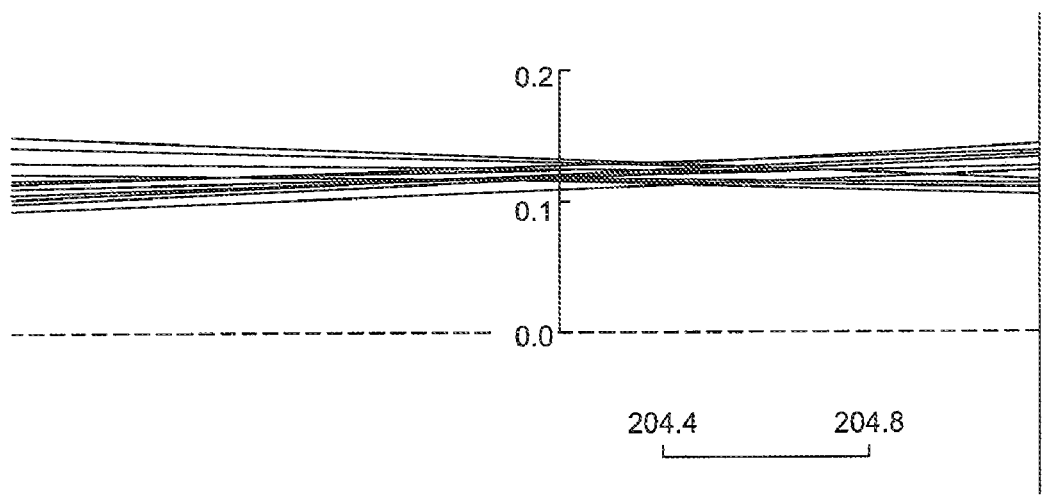
FIG. 3B depicts how the light is deviated ~120 microns from the optical axis from the corresponding tilt of lens 12 in FIG. 3A.

FIG. 3B depicts by enlarging the ray trace at the focal point of the lens system how the light is deviated from the optical axis from the corresponding tilt of lens 12 in the X plane in FIG. 3A.

Figure 3C:
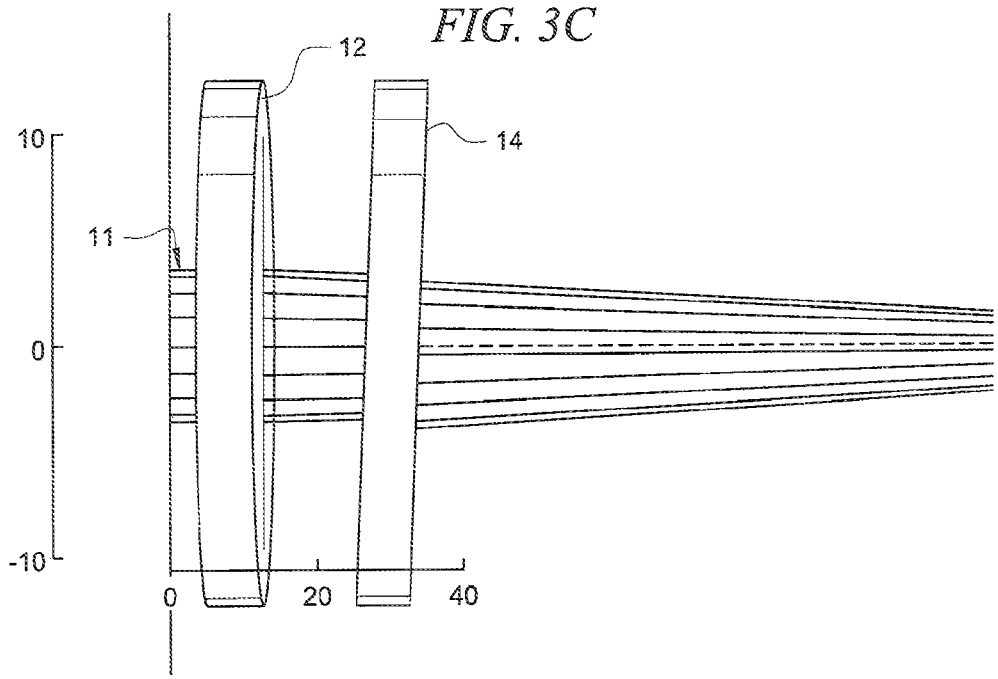
FIG. 3C is a magnified ray trace of the Y-Z planes as light passes through the tilted, inverted meniscus lens pair.

An amplified ray trace of the Y-Z plane as light passes through the tilted, inverted meniscus lens pair is depicted in FIG. 3C.

Figure 3D:
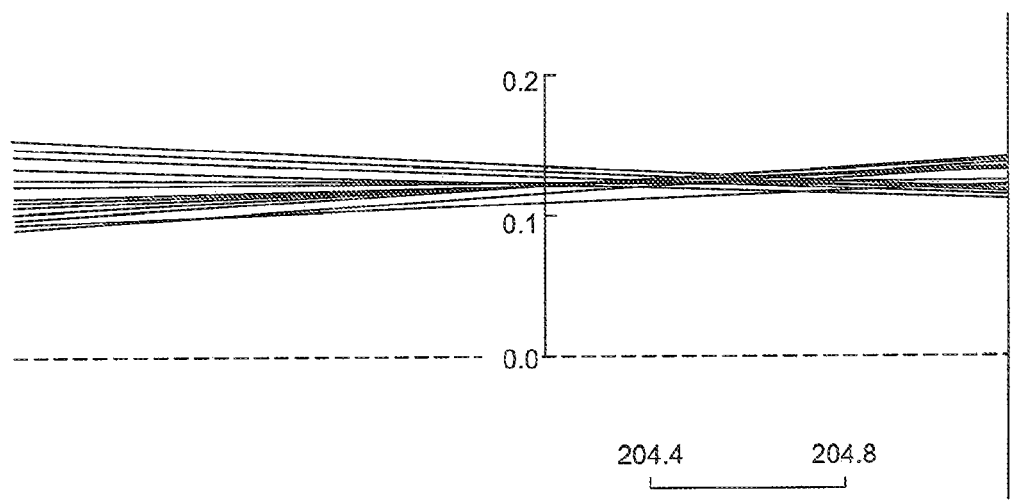
FIG. 3D depicts how the light is deviated from the optical axis from the corresponding tilt of lens 14 in FIG. 3C.

FIG. 3D depicts by enlarging the ray trace at the focal point of the lens system how the light is deviated from the optical axis from the corresponding tilt of lens 14 in the Y plane in FIG. 7C.

Figure 4A:
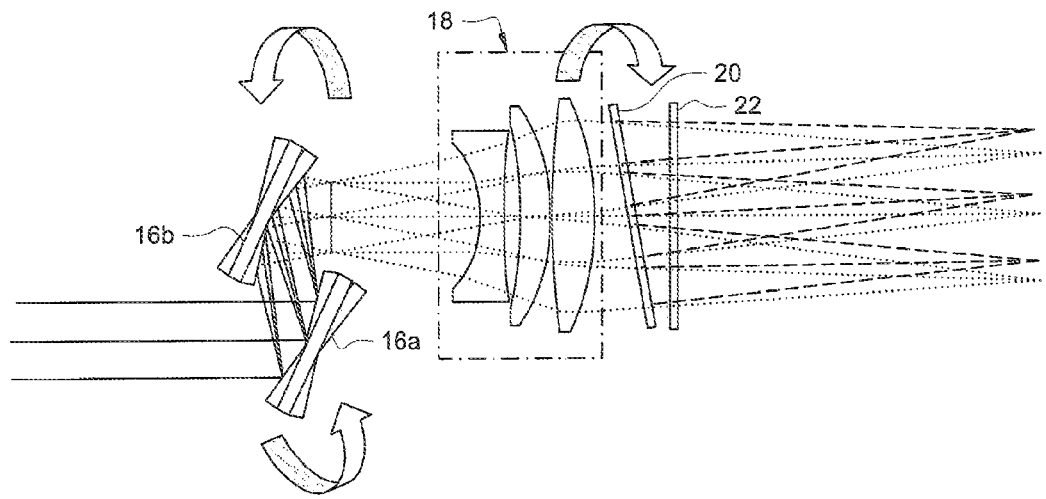
FIG. 4A diagrammatically depicts the second embodiment for precisely displacing a focused laser beam from the optical axis over a very large field, illustrating the X-Z axis plane view.
Figure 4B:
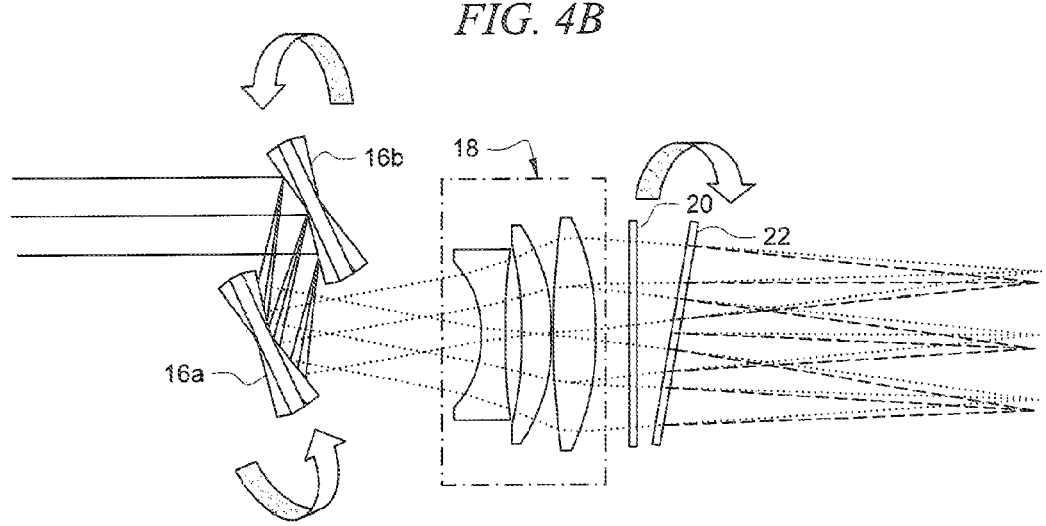
FIG. 4B diagrammatically depicts the second embodiment for precisely displacing a focused laser beam from the optical axis over a very large field, illustrating the Y-Z axis plane view.
Figure 8A:
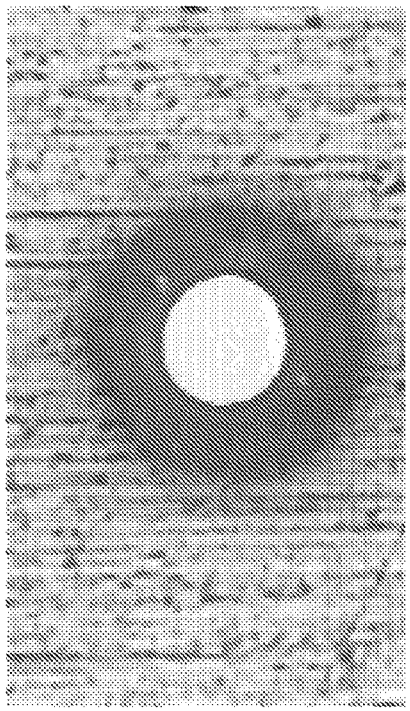
FIG. 8A depicts a circular geometrical figure machined in stainless steel with the second preferred embodiment.
Figure 8B:
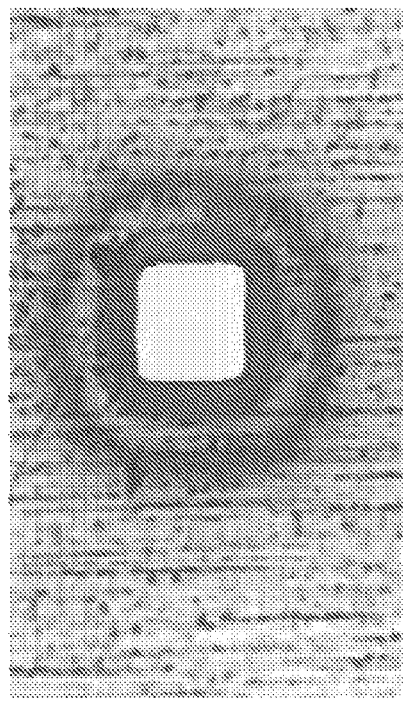
FIG. 8B depicts a square geometrical figure machined in stainless steel with the second preferred embodiment.
Figure 8C:
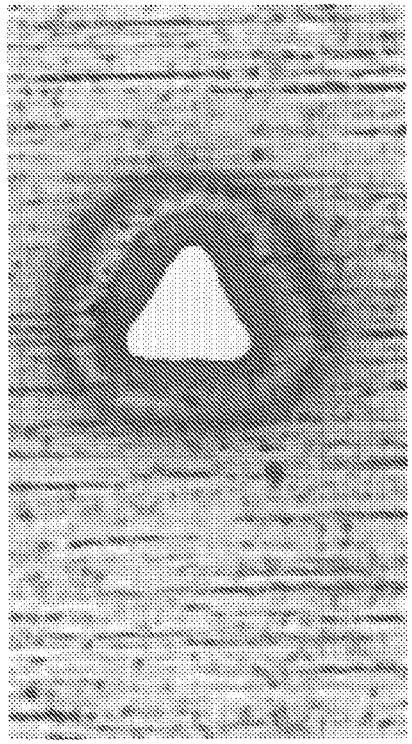
FIG. 8C depicts a triangular geometrical figure machined in stainless steel with the second preferred embodiment.
Figure 8D:
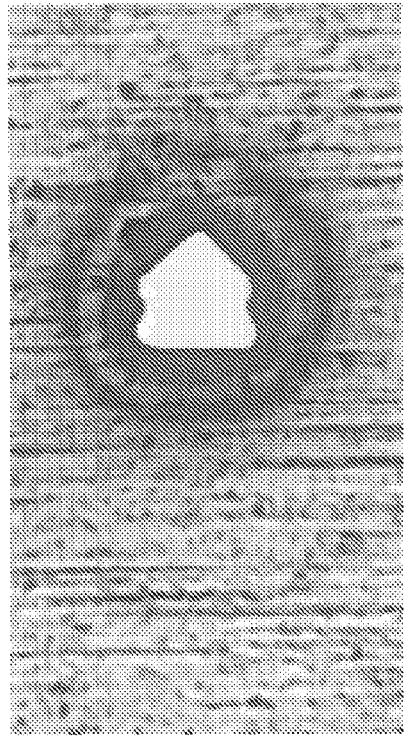
FIG. 8D depicts an irregular geometrical figure formed by machining in stainless steel a second triangle atop a first triangle with the second preferred embodiment.
Figure 9A:
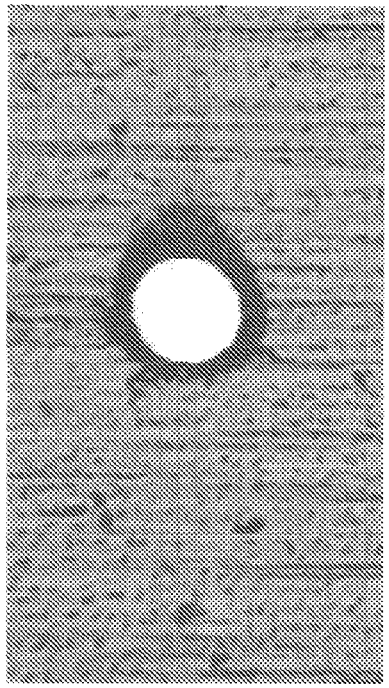
FIG. 9A depicts a circular geometrical figure machined in stainless steel with a calibrated ScanLab Hurryscan II scanner of the prior art.
Figure 9B:
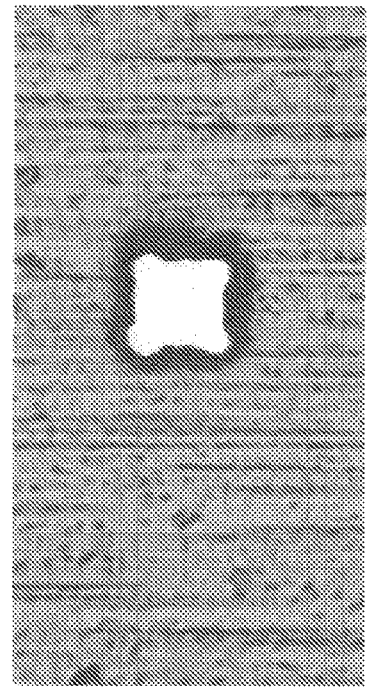
FIG. 9B depicts a square geometrical figure machined in stainless steel with a calibrated ScanLab Hurryscan II scanner of the prior art.
Figure 9C:
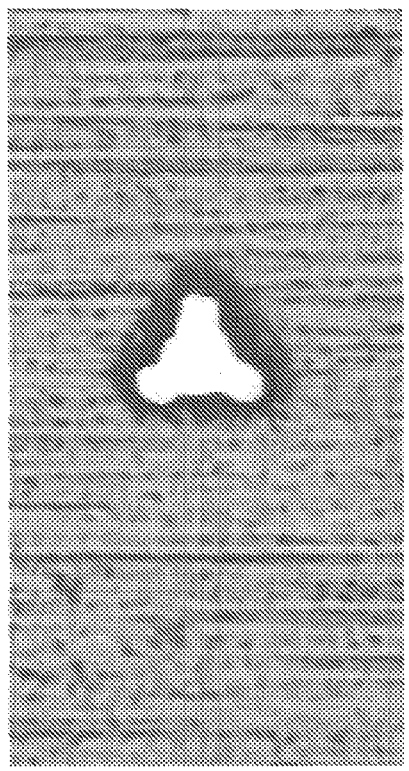
FIG. 9C depicts a triangular geometrical figure machined in stainless steel with a calibrated ScanLab Hurryscan II scanner of the prior art.
Figure 9D:
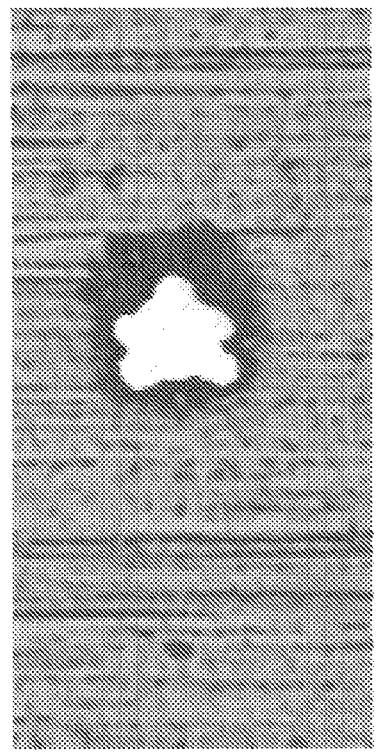
FIG. 9D depicts an irregular geometrical figure formed by machining in stainless steel a second triangle atop a first triangle with a calibrated ScanLab Hurryscan II scanner of the prior art.

FIGS. 4A and 4B depict a second embodiment for displacing a focused laser beam from an optical axis. A laser beam enters a galvo scanner device that includes first and second galvo mirrors 16a, 16b. The beam is reflected from first galvo mirror 16a onto second galvo mirror 16b. From second galvo mirror 16b, the beam passes through F-theta lens 18 which typically includes three (3) lens elements as depicted in the drawing surrounded by a dashed rectangle. The beam exits F-theta lens 18 and passes through a pair of parallel plates 20, 22, each of which is mounted to a galvanometer. The parallel plate galvanometers are orientated orthogonally to one another so that the beam can be offset from the optical axis in a controlled way. The offset of the beam is determined by the angle of the plate, its thickness and the index of refraction of the plate. The dashed lines at the focal point of the lens represent the original optical axis. FIG. 8A depicts the X-Z plane and FIG. 8B depicts the Y-Z plane. Parallel plates 20, 22 are tilted in FIGS. 8A and 8B by ten degrees (10°) for illustration purposes. The combination of the laser scanner and the galvanometer driven parallel plates allows precise features to be machined over a very large field.

FIG. 5 depicts a third embodiment that is an optically equivalent configuration to the preferred embodiment. A laser beam passes through a simple, positive lens 24 and then through a pair of plane, parallel windows 26, 28. Each of the plane, parallel windows is mounted to a galvanometer motor and positioned orthogonally to one another. The only difference between this third embodiment and the second embodiment is that the second embodiment has a pair of galvanometer mirrors to deflect a laser beam through a scan lens (F-Theta type).

In the preferred, second, and third embodiments, the resulting focused light is directed onto a material such as a metal, plastic, glass or ceramic for machining. In the preferred embodiment the meniscus lenses are mounted to galvanometers and oriented orthogonally to one another. The focal length of the lens combination of the two lens system is defined by $1/f = 1/f_1 + 1/f_2 - t/f_1 f_2$, where $f_1$ is the focal length of the first lens, $f_2$ is the focal length of the second lens and t is the separation between lens 1 and lens 2 where it is assumed for simplicity of description that the lenses used fall within the "thin lens" regime. The two lenses are tilted and naturally introduce specific lens aberrations such as coma, astigmatism and spherical aberration. Accordingly, the design of the lens curvatures, thickness and material are optimized to minimize said lens aberrations at the designed radial displacement from the optical axis.

An inverted positive meniscus lens pair produces the least aberrations for the preferred embodiment. It is desired to have a high index optical material to facilitate longer radius of curvature surfaces and keep the optical elements as thin as possible to further minimize the aberrations. It will be obvious to those skilled in the art that other lens curvatures can be used besides inverted, positive meniscus lenses, e.g., a pair of plano-convex lenses; pair of double convex lenses, etc. In the preferred embodiment it has been determined that the inverted, positive meniscus lens pair provides minimal aberrations and best optical performance.

The tilting of each of the two meniscus lenses causes the laser beam to be displaced in a controlled way from the optical axis. The amount of displacement is dependent upon the power of the designed lenses and the angle that the lenses are tilted about the optical axis and orthogonally to one another. In the preferred embodiment where the lens material is sapphire with an index of refraction of 1.796, a combined lens pair focal length of approximately 200 mm and a tilt angle of ten degrees (10°) of each lens, orthogonally, causes a radial shift of the focused spot by >170 microns. Tilting the lenses beyond ten degrees causes the coma to become too great for usefulness. As the lenses are tilted, the position of the focal spot changes along the optical axis due to spherical aberration. This shift can be compensated in a well-known controlled way, as is know to those skilled in the art by adding a motorized zoom lens system before the lens pair or by moving the workpiece along the Z axis.

The preferred embodiment has a limited field that is determined by the focal length of the lens pair and the angle of rotation, but nonetheless provides very high precision capability of features below 500 microns in size in a very simple opto-mechanical configuration.

Another variation of the design places plane parallel plates onto the galvanometers of the preferred embodiment, instead of the inverted, positive meniscus lenses, and positioned after a typical galvo-based laser scanner (a galvanometer mirror pair and an F-Theta lens). The parallel plates permit the controlled shift of the laser beam passing through the scanner system and F-Theta lens. The plates are "thin" so the introduced aberration is minor spherical aberration and allows accurate machining of finite features over the large area of the scanner/F-Theta system which can range from a few millimeters to hundreds of millimeters, depending upon the rotation angle of the galvo scan mirror and the focal length of the F-theta lens. Through software control of the two galvo pairs, features can be accurately machined over a field range limited only by the scanner/F-Theta system used.

Figure 6:
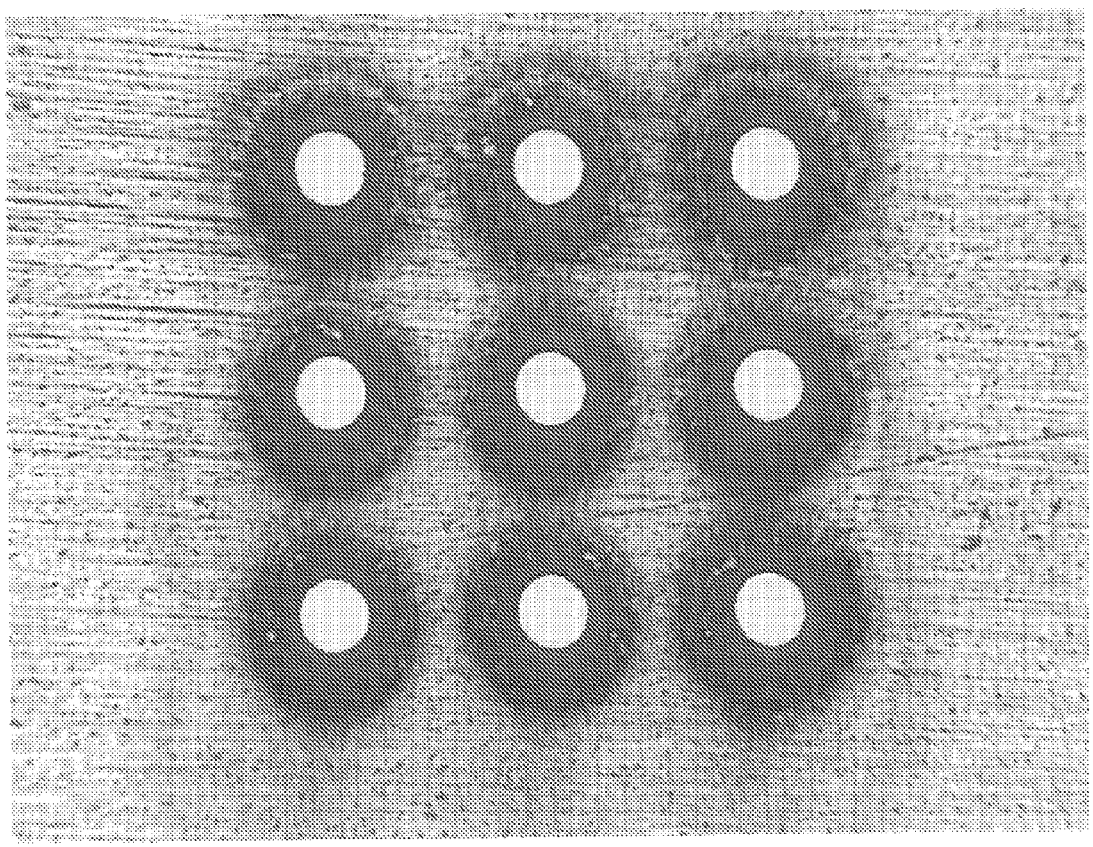
FIG. 6 depicts an array of circular holes machined in stainless steel with the preferred embodiment.

FIG. 6 depicts an array of nominally 155 μm diameter holes with a corresponding sigma of 0.049 machined with the second embodiment of the novel device.

Figure 7:
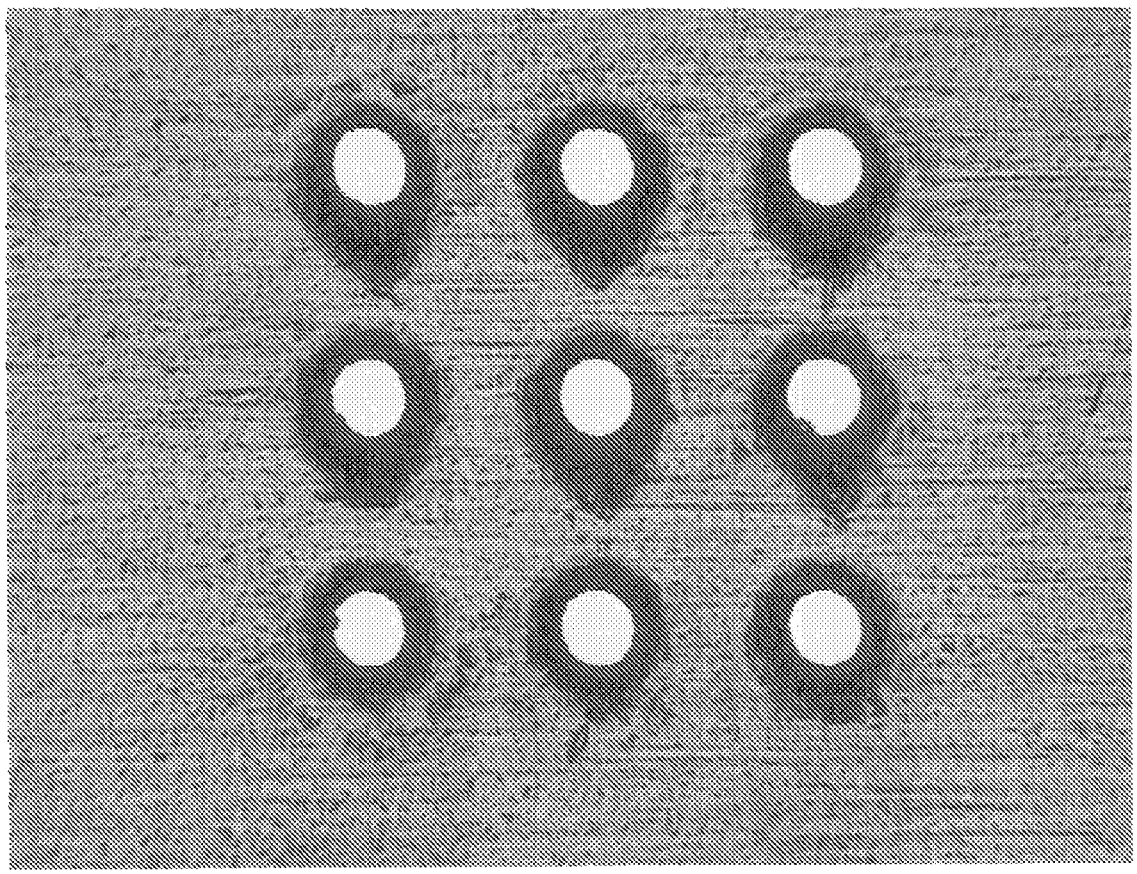
FIG. 7 depicts an array of circular holes machined in stainless steel with the ScanLab Hurryscan II of the prior art.

FIG. 7 depicts the same holes as depicted in FIG. 6, machined with a ScanLab Hurryscan II scanner (F-theta lens=100 mm) of the prior art, having a sigma of 2.297.

A comparison of FIGS. 6 and 7 indicates that the novel device consistently produces highly regular circular holes and that the prior art device does not.

FIGS. 8A-D respectively depict a circle, square, triangle and an irregular shape formed by a second triangle formed on top of a first triangle, machined in 80 um thick stainless steel by a second embodiment of the novel structure disclosed herein and having a nominal feature size of 150 μm.

FIGS. 9A-D respectively depict a circle, square, triangle and an irregular shape formed by a second triangle on top of first triangle, machined in stainless steel with a calibrated ScanLab Hurryscan II scanner (F-theta lens=100 mm) of the prior art.

The nominal size of these features is about 150 μm.

A comparison of FIGS. 8A-D and FIGS. 9A-D indicates that the geometrical shapes formed in stainless steel by the second embodiment of the novel device are substantially true to idealized shapes and that the geometrical shapes formed by a prior art device deviate substantially from the desired ideal shape.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A device for laser machining very precise geometric features over a large processing window, comprising:
    a first lens mounted to a first galvanometer;
    a second lens mounted to a second galvanometer;
    said first and second lenses focusing an incoming laser beam and defining an optical axis;
    said first galvanometer adapted to tilt said first lens about an X axis;
    said second galvanometer adapted to tilt said second lens about a Y axis;
    whereby the focused laser beam is displaced in a controlled manner from said optical
    axis by the first tilting lens and the second tilting lens.

2. The device of claim 1, further comprising:
said first and second lenses being a pair of inverted positive meniscus lenses.

3. The device of claim 2, further comprising:
each of said inverted positive meniscus lenses being formed of an optical material having an index that is optimal for the wavelength of said laser beam to minimize the thickness of said lenses and hence to minimize optical aberrations.

4. The device of claim 1, further comprising:
means for compensating for irregularities in the focused laser beam.

5. The device of claim 4, further comprising:
said means for compensating for irregularities including scanner programming means where a scanner is programmed to move a focal spot in opposition to an unwanted movement to compensate for such unwanted movement so that the result is a desired geometry.

6. The device of claim 3, further comprising:
each lens of said first and second lenses being formed of a high index of refraction.

7. The device of claim 6, further comprising:
said first and second lenses having a combined lens pair focal length of approximately 200 mm;
each lens of said first and second lenses having a tilt angle of ten degrees (10°), said tilt angle being orthogonal relative to an optical axis of each lens;
said tilt causing a radial shift of a focused spot by an amount greater than one hundred seventy microns (170μ).

* * * * *